No. 816,057. PATENTED MAR. 27, 1906.
T. ALEXANDER.
EXCAVATOR SHOVEL.
APPLICATION FILED MAR. 28, 1905.
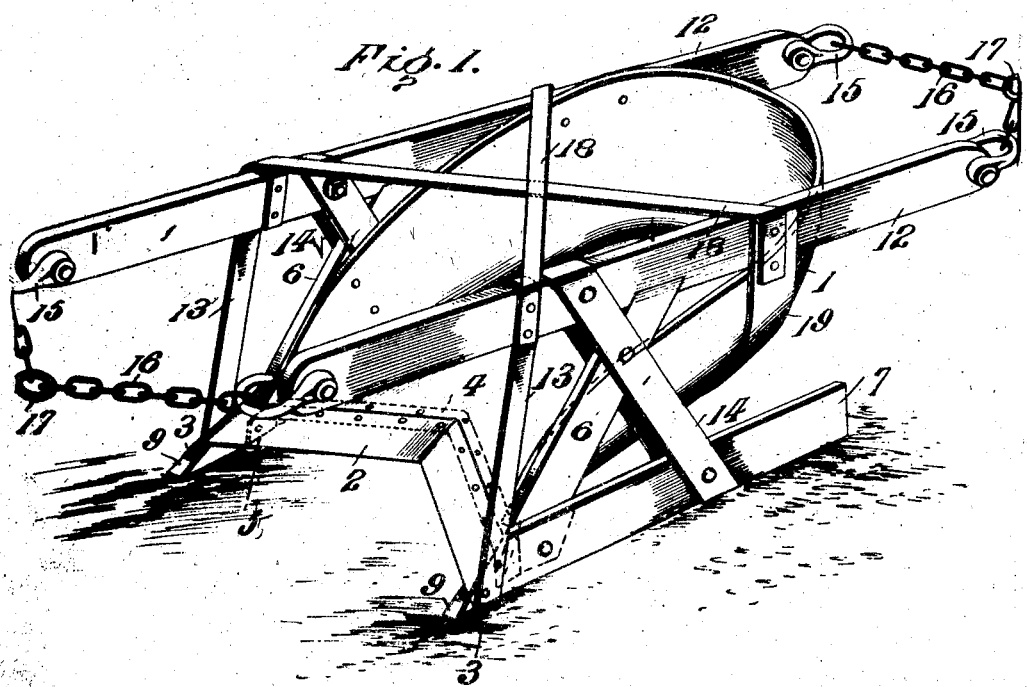
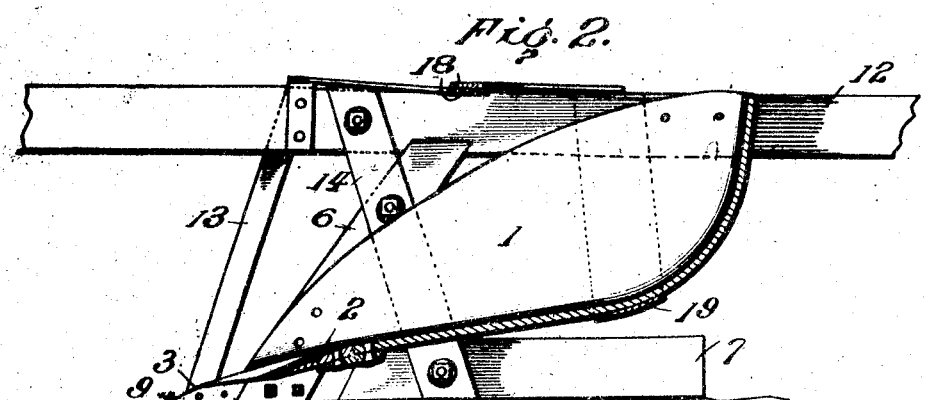
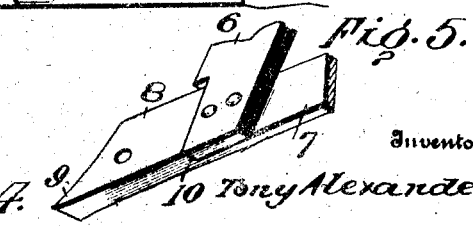
Inventor
Tony Alexander

UNITED STATES PATENT OFFICE.

TONY ALEXANDER, OF BROOKHAVEN, MISSISSIPPI.

EXCAVATOR-SHOVEL.

No. 816,057.  Specification of Letters Patent.  Patented March 27, 1906.

Application filed March 28, 1905. Serial No. 252,563.

*To all whom it may concern:*

Be it known that I, TONY ALEXANDER, a citizen of the United States, residing at Brookhaven, in the county of Lincoln and State of Mississippi, have invented certain new and useful Improvements in Excavator-Shovels, of which the following is a specification.

This invention has relation to scoops or shovels designed for excavating, dredging, loading, and unloading and wherever a shovel of the scoop type is adapted for use in scraping, leveling, and digging.

One of the principal objects of the invention is the provision of a shovel of the class aforesaid which will be braced and stayed in every possible direction and admit of the pulling and dumping strain being applied in such a manner as not to affect the structure of the shovel and which will have landside-bars to obviate side draft and insure movement of the shovel in a direct line.

For a full description of the invention and the merits thereof and also to acquire a knowledge of the details of construction of the means for effecting the result reference is to be had to the following description and accompanying drawings, in which—

Figure 1 is a perspective view of a shovel embodying the invention. Fig. 2 is a central longitudinal section thereof, end portions of the draft-bars being broken away. Fig. 3 is a detail perspective view of the front end portion of a landside-bar having a portion of the share attached thereto. Fig. 4 is a perspective view of the V-shaped brace connecting the share with the shovel, the same being illustrated on a smaller scale. Fig. 5 is a detail perspective view of the front end portion of a landside-bar and the lower end portion of the standard or brace attached thereto.

Corresponding and like parts are referred to in the following description and indicated in all the views of the drawings by the same reference characters.

The shovel or scoop 1 is of usual form in devices of the class herein referred to, its rear portion being of bowl form and its sides sloping forward and downward. The front edge of the bottom portion of the scoop or shovel is indented and of V form, so as to provide forwardly-diverged cutting edges. A share 2 of V form abuts at its rear edge against the corresponding edge of the shovel and tapers to a knife-edge, as shown most clearly in Figs. 2 and 3. This share 2 is preferably of tempered steel, so as to resist wear and maintain a cutting edge, and thereby add materially to the efficiency of the device. The outer extremities of the share 2 are bent downward, as shown at 3, and lie alongside of the forward ends of the landside-bars 7, to which they are attached in any substantial manner. A brace 4 underlaps the abutting edge portions of the share 2 and shovel or scoop 1 and is attached to each by rivets or like fastenings. The brace 4 is of V form, corresponding to the share 2, and its end portions 5 are bent approximately at a right angle and lie against the inner sides of the lower end portions of the standards or braces 6, to which they are bolted or otherwise attached.

The landside-bars 7 extend in parallel relation, and their front ends are thickened, as shown at 8, either by having blocks welded thereto or in any determinate way. The thickened ends 8 are beveled to provide points 9, which penetrate the earth or material to be loaded in the operation of the shovel. A shoulder 10 is formed at the rear end of the thickened part 8 for the front edge of the standard or brace 6 to abut against, so as to provide a rigid structure. The landside-bars prevent side draft of the shovel when in operation and insure movement thereof in a direct line.

Draft-bars 12 extend approximately in parallel relation and are arranged in the plane of the upper edge portion of the shovel or scoop and are attached to the sides of the latter near their rear ends and to the forward portion of the shovel by means of the standards or braces 6 and by means of cutters 13 and braces 14. Clevises 15 are fitted to the ends of the draft-bars 12, and draft-chains 16 are connected thereto and to a draft-ring 17, to which operating ropes or cables are attached. Crossed braces 18 connect the draft-bars 12 intermediate of their ends. The braces 14 are attached at their upper ends to the draft-bars and incline rearwardly and downwardly and are made fast at their lower rear ends to the landside-bars 7 and at a point between their ends to the standards 6. The braces 14 comprise companion parts which embrace opposite sides of the bars 7 and 12 and the standard 6. The standards or braces 6 are attached at their upper ends to the draft-bars 12 and incline forwardly and downwardly and have their lower end portions attached to the sides of the shovel or scoop by rivets or like fastenings. The cutters 13 are located in front of the standard 6 and are attached at their upper ends to the draft-bars 12 and at their lower ends to the front ends of the landside-bars 7. A sling 19 encircles the rear portion of the shovel or scoop and is attached at its ends to the draft-bars 12.

In operation the draft is applied directly to the foremost draft-chains 16, thence to the shovel or scoop through the draft-bars 12 and intermediate connections, thereby distributing the strain throughout the shovel in a way to obviate injurious strain upon any one point and with the further result of causing the shovel to run true and steady, the landside-bars 7 materially assisting in the attainment of these ends as well as forming runners for the shovel or scoop to glide upon. When the shovel is utilized for carrying a load from one point and dumping it at another point, a controlling-cable is hitched to the rearmost draft-chains, and the pulling-cable is attached to the foremost draft-chains and in the advance of the shovel to catch up the load, the pull is on the advance draft-chains, and when the load is to be dumped the controlling-cable is held taut and the pulling-cable slackened, thereby permitting the shovel to swing downward at its front edge and discharge the load. The cutters 13 facilitate the separation of the earth at the sides of the slice formed by the share 2 in the advance of the shovel, thereby preventing the earth banking against the front edges of the standards 6. The draft-bars, landside-bars, sling, and braces form, in effect, a substantial framework, to which the shovel or scoop is fitted, and which framework materially increases the period of usefulness of the shovel and adds materially to its effectiveness.

Having thus described the invention, what is claimed as new is—

1. A shovel or scoop of the type described having its front edge indented and approximately of V form, a share of V form having bent terminals and having its rear edge abutting against the front edge of said shovel, a V-brace underlapping the joint formed between the share and shovel and secured to each and forming connecting means and provided with bent terminals, and landside-bars having their front ends secured between the bent terminals of the share and brace.

2. In combination with a shovel or scoop of the type described, companion draft-bars secured to opposite side portions of the shovel and provided at opposite ends with draft devices.

3. In combination, a shovel or scoop of the type described, draft-bars secured to the upper side portions of the shovel and provided at their ends with draft devices, and brace connecting said draft-bars and arranged over the shovel to stay the same.

4. In combination, a shovel or scoop of the type described, draft-bars at opposite sides thereof, landside-bars having their front ends connected with the forward portion of the shovel, and standards between the draft-bars, landside-bars and scoop.

5. In combination, a shovel or scoop of the type described, landside-bars at opposite sides of the shovel and having their front ends beveled to form penetrating points, draft-bars, and connecting means between the draft-bars, landside-bars and shovel.

6. In combination, a shovel or scoop of the type described, draft-bars, landside-bars having their forward ends thickened and beveled to provide penetrating points, standards connecting the draft-bars with the landside-bars and abutting at their lower front edges against the shoulders formed by said thickened parts of the latter.

In testimony whereof I affix my signature in presence of two witnesses.

TONY ALEXANDER. [L. S.]

Witnesses:
J. D. YOAKLEY,
V. B. HALLYARD.